Aug. 11, 1936.  W. STELZER  2,050,900
SCAFFOLDING
Filed April 10, 1935
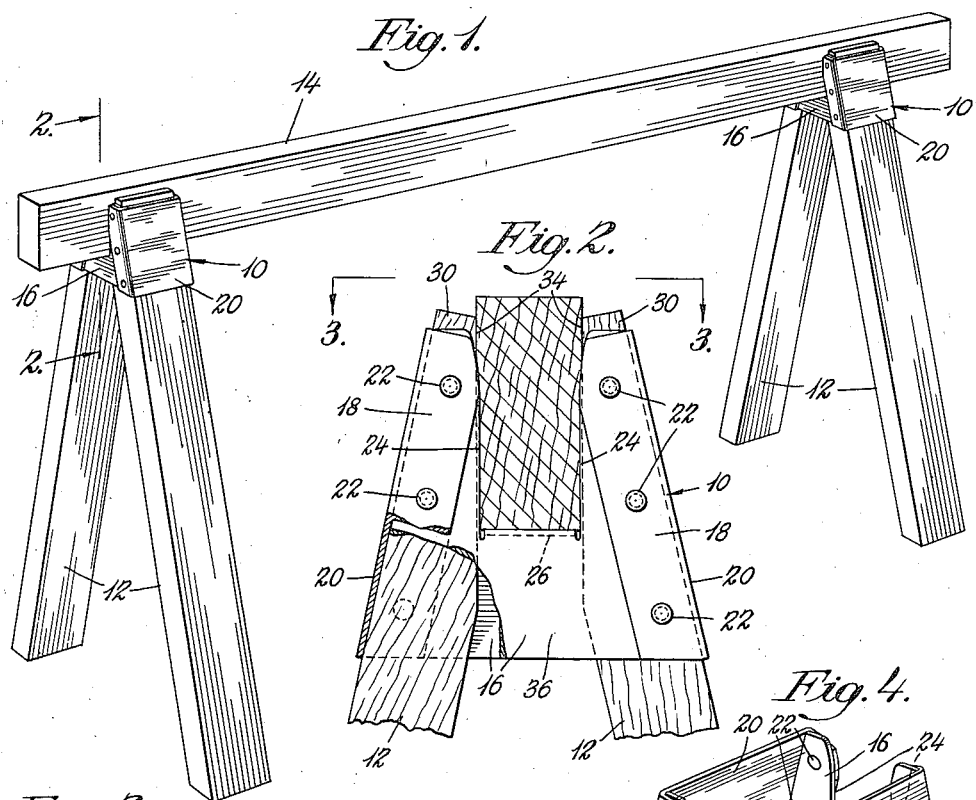
William Stelzer
INVENTOR
BY Victor J. Evans & Co.
HIS ATTORNEYS Patented Aug. 11, 1936

2,050,900

UNITED STATES PATENT OFFICE 2,050,900

SCAFFOLDING

William Stelzer, Oak Park, Ill.

Application April 10, 1935, Serial No. 15,665

1 Claim. (Cl. 304—5)

My invention relates to scaffolding, and has among its objects and advantages the provision of a novel coupling head for a knockdown horse.

An object of my invention is to provide a coupling head for holding the plank supporting pieces and legs in assembled relation, and in which means is embodied for compensating for structural variations, shrinking, and expansion of the timber.

A further object is to provide a head for supporting the legs in such angular relation as to provide a sturdy device within the altitude ranges common in the art.

In the accompanying drawing:

Fig. 1 is a perspective view of a horse embodying the invention;

Fig. 2 is a sectional view along the line 2—2 of Fig. 1;

Fig. 3 is a view taken from the position indicated by line 3—3 in Fig. 2, with a part of the structure broken away for the sake of clearness;

Fig. 4 is a perspective view of the coupling head partly in section; and

Fig. 5 is a perspective view of another form of coupling head.

In the embodiment selected to illustrate my invention, I make use of a pair of coupling heads 10 for connecting detachable legs 12 and a cross piece 14 into a unitary whole. Both heads are identical in construction so that the description of one will apply to both.

Referring to Fig. 4, the head comprises sheet metal end pieces 16 of tapered configuration. These pieces are arranged in overlapping relation with flanges 18 comprising integral parts of side pieces 20 formed of sheet metal. I have indicated rivets 22 for connecting the pieces 16 with the flanges 18. While I have indicated rivets for connecting the pieces 16 with the flanges 18, I have found that the parts may be connected together by spot welding with good results.

Each of the pieces 16 is severed along lines 24 inwardly of the narrow end, and the material bent inwardly to provide a supporting ear 26. These ears are arranged in a common plane. In bending back the ears 26 I provide a recess in the pieces 16 for the reception of the cross piece 14 which is preferably of wood, and rectangular in cross section. The bottom edge of the cross piece 14 lies upon the ears 26, while the sides of the recesses press firmly against the sides of the cross piece to frictionally retain the latter in position. Each of the ears 26 is provided with an opening 28 for the reception of a nail or screw which may be imbedded in the cross piece 14 should additional anchorage be desired.

The pieces or walls 16 are arranged in parallel relation, while the pieces or walls 20 are arranged in angular and spaced apart relation with the cross piece 14 (see Fig. 2). The spaces between the walls 20 and the cross piece 18 is occupied by the upper ends 30 of the supporting legs 12. Each upper end is cut away to provide an angular face 34 fitting snugly against the side of the cross piece 14 with the opposite side of the leg lying against its respective wall 20. When the ends 30 are driven home the cross piece 14 will be found firmly between the two leg ends while the latter will be held tightly between the cross piece and the walls 20. The legs 12 are preferably of wood and the relation between the wood legs and the cross piece 14 is such as to provide a good frictional holding relation.

My construction is a durable one in that the nature of the walls 16 and 20 is such as to provide a relatively large amount of material at 36 which tends to resist breaking forces incident to driving the legs firmly into holding relation with the cross piece. At the same time, the ears 26 lie within the contour of the head so that no parts project beyond the head proper. This arrangement makes for compactness. I prefer to have the cross piece 14 project slightly above the head and arrange the spacing between the walls 20 and the sides of the piece 14 in such a manner as to permit the upper ends of the legs to be driven above the head, whereby a good connection is attained at all times.

The angularity of the faces 34 with respect to the opposite sides of the legs is such as to provide a maximum spread of twenty-eight inches between the bottom ends of the legs when cut at such lengths as to position the upper edge of the cross piece 14 approximately five feet above the supporting surface for the legs. This angularity gives a spread of eighteen inches for legs cut to provide a three foot level. Conventional horse heights range between these limits and the spread is such as to provide good stability for the horse between the ranges and at the same time provide a spread which permits the horse as a whole to be positioned in close relation with the work.

In Fig. 5, I have illustrated a slightly different form of head in which the bottom edges 36 of the recesses 38, corresponding to the recesses in the wall 16, is provided with a piercing element 40 positioned to enter the bottom edge of the cross piece 14 when driven home. In practically all cases, the recesses are of such width with respect to the cross piece as to provide sufficient holding relation. Of course, the upper ends 30 of the legs 12 pinch the cross piece 14 with sufficient force to hold the piece firmly in position.

The legs 12 and the cross piece 14 may be easily disconnected by merely striking the upper ends of the legs with a hammer to loosen the assembly.

Without further elaboration, the foregoing will so fully explain my invention that others may, by applying current konwledge, readily adapt the same for use under various conditions of service.

I claim:

The combination with a normally horizontal supporting member rectangular in cross section, of a head having two spaced apart walls arranged in parallel relation and two spaced apart walls arranged in converging relation, the parallel walls having slots for the reception of said member, the material of the parallel walls corresponding to said slots being bent inwardly of the walls, to provide two ears bearing against said member, said converging walls being arranged in spaced and angular relation with two opposite sides of said member, and a pair of supporting legs, said legs having ends shaped to provide angular faces bearing against the said opposite sides of said member with their opposite sides bearing against said converging walls, the ends of the legs with the angular faces being arranged to extend above said head.

WILLIAM STELZER.